May 12, 1959 N. CUSHMAN ET AL 2,886,788

VARIABLE INDUCTOR

Filed May 4, 1954 4 Sheets-Sheet 1

INVENTORS
NORTON CUSHMAN and
ROLAND H. C. YII
BY
Connolly and Hutz
THEIR ATTORNEYS INVENTORS
NORTON CUSHMAN and
ROLAND H. C. YII
BY
Connolly and Hutz
THEIR ATTORNEYS May 12, 1959 N. CUSHMAN ET AL 2,886,788

VARIABLE INDUCTOR

Filed May 4, 1954 4 Sheets-Sheet 3

INVENTORS
NORTON CUSHMAN and
BY ROLAND H.C. YII
Connolly and Hutz
THEIR ATTORNEYS May 12, 1959 N. CUSHMAN ET AL 2,886,788

VARIABLE INDUCTOR

Filed May 4, 1954 4 Sheets-Sheet 4

INVENTORS
NORTON CUSHMAN and
ROLAND H. C. YII
BY
Connolly and Hutz
THEIR ATTORNEYS United States Patent Office 2,886,788

Patented May 12, 1959

2,886,788

VARIABLE INDUCTOR

Norton Cushman, Williamstown, and Roland H. C. Yii, North Adams, Mass., assignors to Sprague Electric Company, North Adams, Mass., a corporation of Massachusetts Application May 4, 1954, Serial No. 427,642

1 Claim. (Cl. 336—79)

Figure 1:
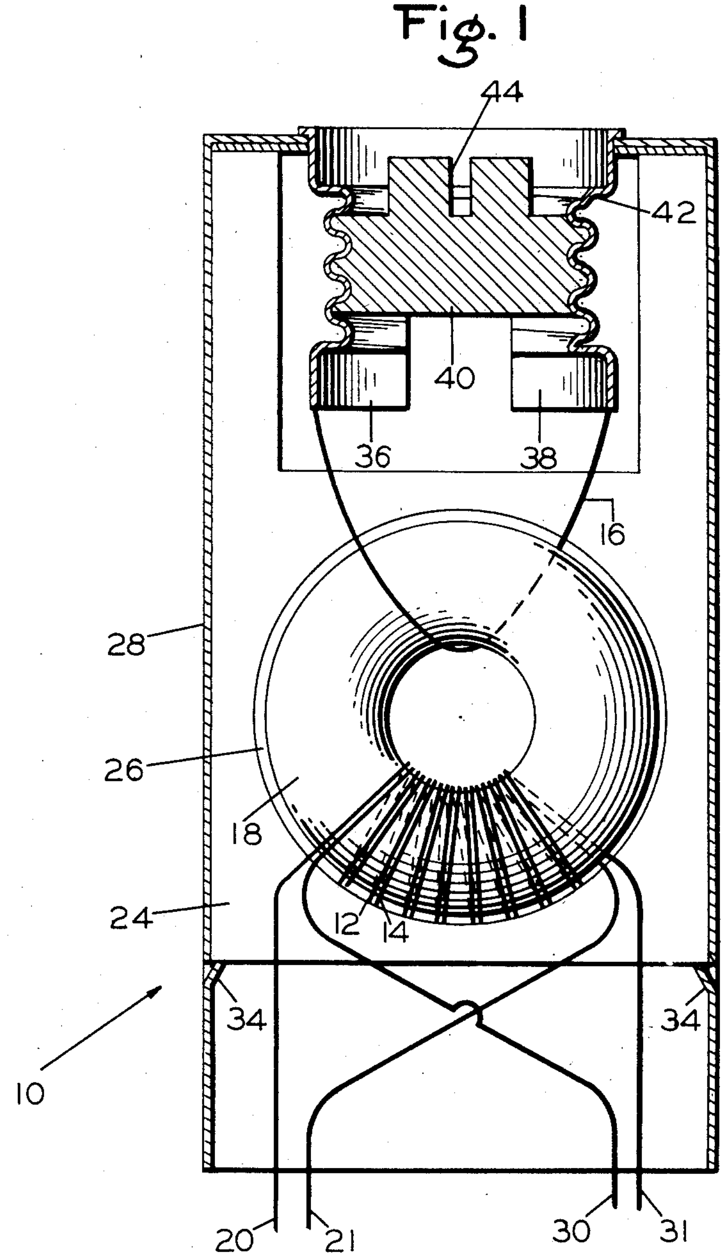

This invention relates to electrical components and more particularly to inductively tuned elements which are particularly applicable for utilization in ultra high frequency transmitting and receiving equipment.

Ultra high frequency tuned circuits generally utilize only the stray circuit capacitance to resonate with a tunable inductance element. Although the fixed capacitor required for operation at lower frequencies has been deleted, the tuned inductive elements are still excessive in size so that little was gained volume wise of the closely packed electronic assembly and this has brought about little alleviation of the crowded conditions or facilitated little the reduction of the overall size of the assembly. Most known inductors for use in tuned circuits are permeability tuned which in itself has the distinct disadvantage of varying the Q over the tuning range and the lowering of the Q deleteriously affects the ability of the tuned circuit to yield high gain and selectivity. Furthermore, the inductors are generally shielded, which shields, if not maintained at appreciable distances from the inductor, materially decrease the Q of the assembly by short-circuiting some of the magnetic flux associated with the inductor. For this latter reason inductive assemblies have suffered little miniaturization although it is highly desirable to obtain substantial miniaturization without impairment of electrical characteristics.

It is an object of this invention to overcome the foregoing and related disadvantages. It is a further object of this invention to produce a tunable IF transformer having improved electrical characteristics with appreciably reduced volume. Further objects of this invention will be apparent from the following specification and appended drawings.

The objects of this invention have been achieved by the production of a variable inductor comprising a ferromagnetic material presenting a substantially closed path to induced magnetic flux, a primary conductor coiled about said magnetic material, said primary conductor exhibiting self-inductance, and a shorting conductor coiled about said magnetic material. More particularly, these objects have been achieved by the preparation of a high Q transformer comprising a ferromagnetic material presenting a substantially closed path to induced magnetic flux, a first primary conductor exhibiting self-inductance coiled about said magnetic material, a second primary conductor exhibiting self-inductance coiled about said magnetic material, said induced magnetic flux linking said first primary conductor to said second primary conductor and a shorting conductor coiled about said magnetic material.

This invention is featured first by the use of a ferromagnetic material as an inductor core member which is of such physical form that it offers a substantially closed path to any magnetic flux induced in said ferromagnetic material. A second feature of this invention is a secondary or shorting conductor coiled about the ferromagnetic core which can be adjusted in resistance or in its position relative to the inductor conductor or conductors wound about the core material so as to vary the effective inductance of the said other conductor or conductors.

According to the present invention miniaturization difficulties are reduced by the utilization of a core material offering a substantially closed path to the induced magnetic flux, a relatively closely fitting shielding member, the tuning of the inductor being effected by variation of the position and/or the resistance of a secondary winding linked with the core.

Figure 2:
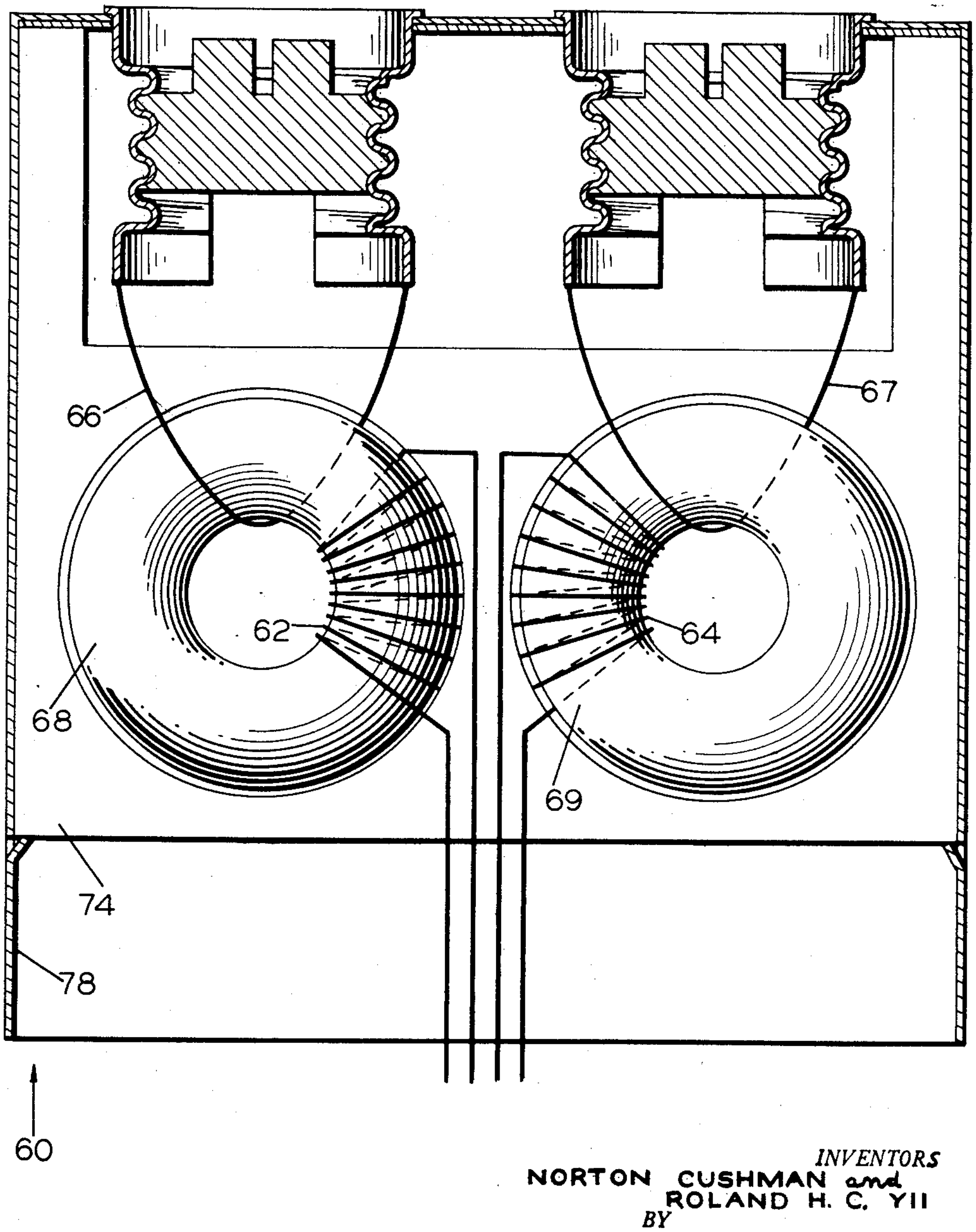
Figure 3:
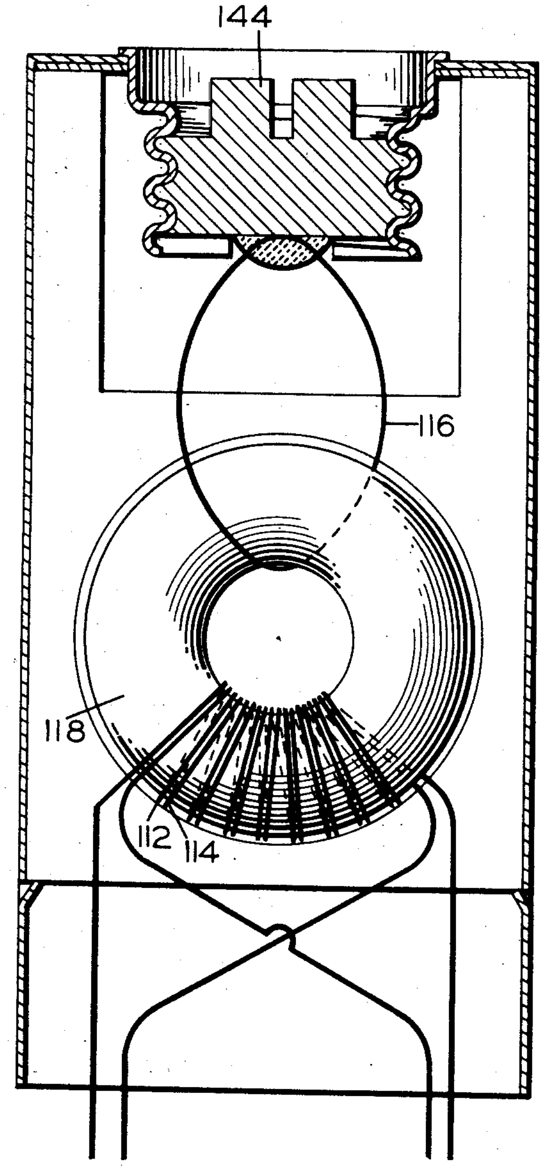
Figure 4:
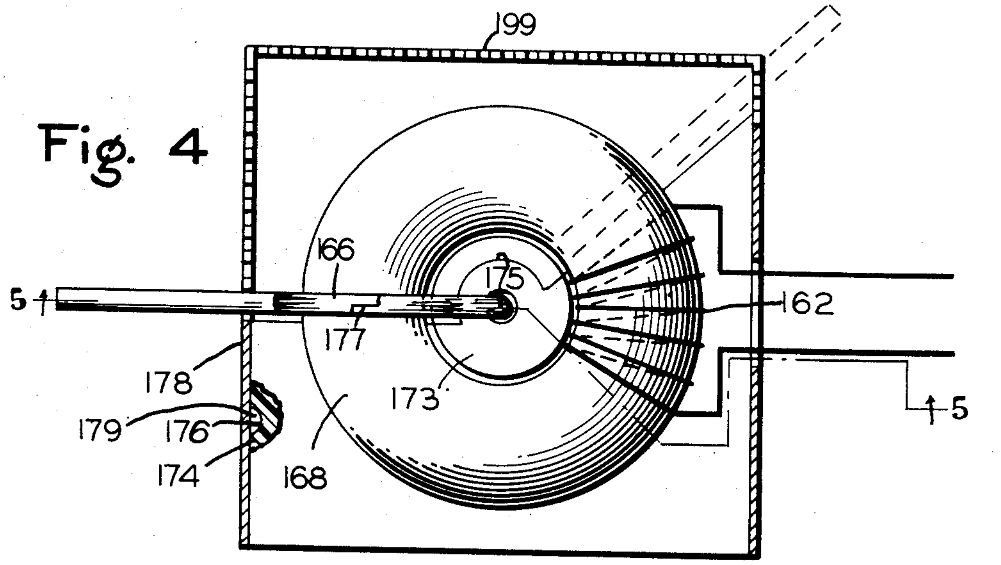
Figure 5:
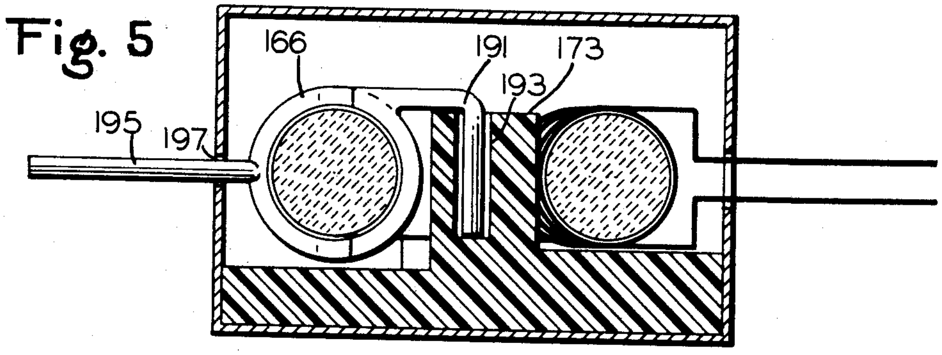
Figure 6:
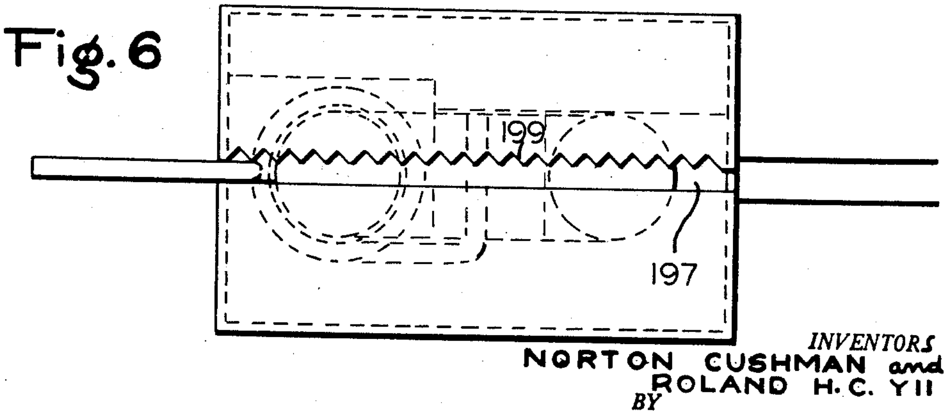

To assist in understanding the invention, reference is made to the appended drawings in which Fig. 1 pictorially represents one form of transformer embodying the present invention, Fig. 2 represents an alternative transformer construction in accordance with the present invention, Fig. 3 represents a still further transformer construction typical of this invention, Fig. 4 is a sectional view of still another exemplification of the invention, Fig. 5 is a sectional view of the construction of Fig. 4 taken along the line 5—5, and Fig. 6 is a plan view taken from the top of the construction of Fig. 4.

In Fig. 1 there is shown an IF transformer 10 which has bifilar windings 12, 14 for the primary and secondary, respectively, with tuning by means of a shorting loop 16 through variation of the shorting resistance presented by this loop. As a magnetic core a toroid 18 of ferromagnetic material such as pure nickel ferrite is pressed and sintered into shape by conventional techniques. About the toroid are wound the bifilar coils 12, 14 for the input and output windings leads 20 and 21 are the terminals for the input winding and leads 30 and 31 those for the output winding. The toroid is positioned on a supporting structure 24 shown as a resin or paper card having an opening 26 within which the toroid carrying the bifilar winding is frictionally held. The card is in turn fixed in place in a can or container as by opposing grooves in the walls of the can between which grooves the card 24 is slidably received. Tongues 34 cut and bent out of the walls keep the card securely positioned against an opposing can end.

The tuning loop 16 has two ends each separately connected to conducting arms 36 and 38. These arms are of highly resistive material such as thin sheet Nichrome, an alloy containing 60 percent nickel, 15 percent chromium, the balance being essentially iron. An adjustable bridging contact 40 is arranged to electrically connect the arms together so as to vary the electrical resistance between the ends of loop 16. For simplicity of construction the arms 36, 38 can be threaded shank portions of a recessed hollow screw 42 the upper or head end of which can be fastened in place as by welding around a suitably located opening in the wall of can 28.

The shank portions are formed as by slotting out sections of the shank to leave relatively narrow arms. In addition, the threaded surfaces, which in the case of thin metal is best provided by a rolling operation or the like, are on the internal faces of the arms so that they securely engage and grip the bridging member 40 which if desired can have mating thread on its periphery. Rotation of the bridging member 40 in the thread is facilitated for example by slot 44 into which a screw driver can be fitted.

The arms 36 and 38 are arranged to present a resistance which need not be over 10 ohms between the ends of loop 16, when the bridging member 40 is removed as far as possible from the points of attachment of the loop ends. By rotating the bridging member inwardly toward these ends, it will connect the arms in such a way that less resistance is presented between these ends so that the effective resistance of the loop 16 is altered. A minimum resistance of about 1 ohm is generally sufficient to provide all the adjustment that is needed. In fact in most cases the total range of resistance adjustment can be limited to between 2 to 3 ohms. For more positive engagement of the bridging arrangement it is desired to have the arms 36, 38 of somewhat springy nature biased to some degree toward each other so that they pinch the bridging member between them. This also helps hold the bridging member in any position to which it is adjusted so that the tuning is not changed under the influence of vibration or mechanical shock.

In the drawing, dimensions and shapes are somewhat distorted to better show the operation. The can 28 can be held in place on a circuit chassis as by means of the conventional spade lugs (not shown), spring clips or the like.

It has been discovered that the above type of construction can be used for frequencies of 20 to 300 megacycles per second with a core of circular transverse section having an inside diameter of ⅛ inch, an outside diameter of ⅜ inch and with the can wall spaced from the core periphery by as little as $\frac{1}{16}$ of an inch or even less. With a $\frac{1}{16}$ inch spacing, as for example using a can ¾ inch high, ½ inch wide, and ¼ inch thick, Q's of over 100 are obtained.

Although a shorting loop 16 is shown in Fig. 1 as relatively large and lying in a plane tilted somewhat with respect to the general plane of the toroid 18, the invention is not limited to this form. By way of example the loop can be arranged to closely fit around the toroid leaving just a small gap where the ends of the loops are spaced from each other and extend directly over to the arms 36, 38. Additionally where the loop is loosely fitted around the toroid, it can be held in place in a plane perpendicular to the toroid plane or at any other convenient angle with respect to this perpendicular plane.

Another variation of the invention is shown in the transformer 60 of Fig. 2 in which two toroids 68 and 69 of ferromagnetic material are used instead of the single toroid of Fig. 1. About toroid 68 is wound one of the windings 62 of the transformer, while about toroid 69 is wound the other transformer winding 64. The two toroids are positioned by suitable mounting structure 74, which mounting structure is affixed to a container 78. Tuning this construction is accomplished as in that of Fig. 1 by shorting loops. However a separate loop 66, 67 is provided for the respective cores so that each winding can be separately tuned. For best results particularly at the higher frequencies, it is desirable to place the windings 62, 64 at the most closely spaced portions of their cores.

Instead of having the two toroids in substantially the same plane in the construction of Fig. 2, the toroids can be placed side by side so that their circular openings are aligned inasmuch as this provides a more compact construction. Two toroids of the type referred to in connection with Fig. 1 and located side by side in this manner can in fact be held on a post which is frictionally engaged through their circular openings, and the assembly contained in a can ¾ inch by ½ inch by ½ inch. Alternatively the two cores can be arranged concentrically with one larger than and surrounding the other. They can also be disposed in other angular relationships.

Fig. 3 shows a transformer in accordance with the present invention where tuning is provided by adjustment in the position of a shorting loop rather than in its resistance. As illustrated a toroid 118 with bifilar windings 112, 114 is assembled as in the construction of Fig. 1, but shorting loop 116 has its ends directly connected together and secured to rotatable member 144. The constructions can otherwise be identical although it is not necessary in Fig. 3 to have high resistance material holding the rotatable member. In fact member 144 can even be of electrically non-conductive material. Loop 116 is preferably arranged so that it can be rotated around the axis of rotation of member 144 at least to the extent of 40 or 50 degrees. Such rotation of the loop changes its effect on the magnetic flux in the toroid 118 and thereby changes the inductance of windings 112, 114.

Instead of or in addition to the rotation, the shorting loop 116 can also vary its effect on the inductance of the windings by changing the distance between the core and the loop. Thus the lower edge of the loop of Fig. 3 is closest to the toroid, and if the loop is moved downwardly, this edge becomes more separated from the toroid mass, the remainder of the loop coming no closer. This will cause the inductance of the windings to increase.

Figs. 4, 5 and 6 show another technique for tuning the inductance in accordance with the present invention. As more clearly shown in Fig. 4. Magnetic toroid 168 carries inductance windings 162 and is in turn held on a post 173 projecting from a plate-like holder 174. A shorting loop 166 encircles the toroid and is arranged for rotation along the toroid so as to change the distance between the shorting loop and the windings. As illustrated the shorting loop carries a pivot extension 191 which is received in a socket 193 of post 173, and also includes an adjustment arm 195 that projects out radially with respect to the toroid. Post 173 is cut away as shown at 175 to permit the shorting loop to rotate to the desired extent, and the support 174 is conveniently fitted to a housing can 178 in which it can be securely positioned as by means of a recess 176 engaging an identation 179 struck up on the inner surface of a can wall. This loop 166 can be assembled from two segments indicated by the juncture line 177 united together as by soldering or riveting.

With all the components fixed in place, the inductance of windings 162 can be tuned by rotating loop 166 around pivot 193. This is readily accomplished by manipulation of control arm 195, a slot 197 being provided in the can to allow this arm to travel through its required path. In order to make sure the assembly is kept in any desired adjustment, the slot can be arranged to frictionally engage the arm so as to hold it in place unless intentionally moved. As shown in Figs. 4 and 6, one or both edges of the slot 197 can be serrated to present a toothed margin. The arm 195 and/or the remainder of the element carrying the loop 166 can be made springy and can be biased toward the toothed margin where it will anchor itself in place. When adjustment is desired, the arm can then be pushed away from the toothed margin and slid to its desired position. Released in this position the arm itself will return into engagement with the toothed margin and then stay in place between adjacent teeth notwithstanding severe shocks and the like. The teeth in margin 199 can be made much smaller than that illustrated in order to provide a greater number of positions in which the adjustment can be fixed.

The transformers and inductors of the instant invention are operable over the frequency range of from 20 to at least 300 megacycles. When utilized over this range it has been shown by the examples that there are numerous ways of tuning with the shorting loop. Fig. 1 shows tuning through variation of the resistance of the shorting turn while Figs. 3 and 5 illustrate that the assembly may be tuned by movement of the shorting loop relative to that of the primary winding. Similarly the toroid with the primary winding can be moved with respect to the affixed shorting loop. Another method of varying the effective inductance of the assembly is to vary the number of turns of conductor in the shorting loop.

Although with the illustrated constructions it is also possible to further vary the resonant frequency of a tuned circuit carrying the inductance by adjusting a parallel-connected capacitance, this usually decreases the L/C ratio and is accordingly not too desirable in most cases.

The tuning technique shown in Fig. 1, that of varying the resistance of the shorted secondary while maintaining it in a fixed position, has the advantage of minimum changes in Q of the inductance element as it is tuned.

The construction of Fig. 5 however can generally be made most compact.

The present invention provides for the use of either one, two or even a larger number of magnetic cores. The single toroid having bifilar windings is a more compact transformer construction although the multi core construction still effects substantial volume decrease over similar prior art inductive assemblies.

The magnetic core materials preferably have a permeability of at least 5 and within the range of 5 to 20. An example of this type of magnetic core material having such permeability and extremely low losses within the frequency range of from 20 megacycles to 300 megacycles is pure nickel ferrite. An additional type is lithium ferrite. Other materials having satisfactory permeabilities and low losses within this frequency range would be satisfactory for use with our invention, however, nickel ferrite forms the preferred core material because of its electrical characteristics within the above specified frequency range. The preparation of these ferrites in the desired form can be as described in the copending United States application of Brown et al., Serial No. 412,114, filed February 23, 1954.

The configuration of the core may be of any type which has a substantially closed path for induced magnetic flux. An air gap may be introduced into the substantially closed path for the induced magnetic flux so as to vary circuit parameters or to diminish temperature induced variations although this is accomplished at the expense of the overall permeability. The windings of the conductors on the magnetic core material can be of any of the well-known types and such type of winding forms no part of the instant invention. As is well-known the inherent capacitance of the windings can be adjusted to the desired value by variation of the closeness of said primary windings. The size of the wire and the area of winding assists in defining the coupling of the two primary windings in the transformer and must be considered in the production of the tunable inductive assembly.

As an example of our invention, a transformer for operation at 40 megacycles was constructed with two toroids of nickel ferrite each having an outside diameter of ⅜ inch and an inside diameter of ⅛ inch as above described, and held on a common polystyrene post as in the construction of Fig. 5. One of the toroids, wound with 10½ turns of No. 33 enameled copper wire, was resonant within the range of 40 to 41 megacycles (a Q of 150) with a 10 mmfd. capacitor across its terminals. The shorting loop for each toroid consisted of 1 turn of No. 33 wire. The second core had 12½ turns of No. 33 enameled copper wire and was found to have a Q of 110. These windings each extended 25° around the toroid with spacing between the toroids adjusted to provide the desired coupling and shorted turns as in the construction of Fig. 5 for tuning. It was tuned as a double-peaked band pass IF transformer at 43 mc. with a coupling greater than critical having peak-to-peak separation at resonance of 2½ megacycles. The unit was housed in a brass can having the outside dimensions ½ by ½ by 1 inch although its size could still have been materially reduced. The tuning range and sensitivity of tuning was found to be varied predictably by the wire size of this shorted secondary for with increased shorting wire thickness, greater tuning range and increased sensitivity resulted. It is not necessary to move the entire shorting loop when tuning in this manner. A portion of the shorting loop can in fact be kept anchored in position with respect to the inductive wiring and the balance of the loop flexed or pivoted about this anchored portion to effect the desired change in position.

The present invention contributes numerous advantages in addition to the important commercial one of decreased size of IF transformers and tunable inductor assemblies. Our device has minimum change in Q over the entire tuning range, with the Q always in excess of 100. A further advantage is the fact that tuning of the assembly can be made with metal screw drivers or other conductive tools without adverse effects upon the effective inductance due to the presence of a conductive tool portion. This results from the fact that the shorted loop already presents a large amount of conductive material in close proximity to the core, and the addition of more such material makes very little difference. This difference can be further minimized by grounding the shorting loop. This latter advantage is most impressive to the technician who has to slightly detune so as to offset the presence of the conductive tuning tool in the electric field of the inductor and trust that the tuning will be satisfactory when the tool is removed.

This invention is not limited to transformers but is useful in many other embodiments. The single winding structure makes a very effective variable inductor. The units are useful for band pass delay lines as well as other filter and network embodiments. To obtain lower Q's when desired the units are housed in lossy materials or loaded by placing resistors across the winding terminals. The conductors forming the shorting loop as well as the windings, are preferably of insulated wire, but uninsulated wire or even printed conductors can also be used, and the printed conductors can be printed directly upon the surface of the ferromagnetic core.

According to a further phase of the present invention, the desired tuning can be provided by a shorted winding composed of a plurality of turns of conductor encircling the core. By changing the number of turns in the shorted winding as by means of a slide wire contact, a variation in inductance is caused in the inductive or principal winding.

As many apparently widely different embodiments of this invention may be made without departing from the spirit and scope hereof, it is to be understood that the invention is not limited to the specific embodiments hereof except as defined in the appended claim.

What is claimed is:

A transformer comprising a toroid of ferromagnetic material having an outer diameter of about ⅜ inch presenting a substantially closed path to induced magnetic flux, a bifilar pair of conductors coiled about a first sector of said toroid, said conductors exhibiting self-inductance, a continuous shorting conductor looped about said toroid in a second sector of said toroid so as to vary the self-inductance of the bifilar conductors, a rotatable member for adjustably positioning the continuous looped conductor mounted radially of said toroid adjacent said second sector having an axis of rotation radial to the toroid, a threaded shank portion of said rotatable member, a recessed hollow screw engaged by said threaded shank portion providing axial movement to said rotatable member upon rotation of the rotatable member, means on the rotatable member securing the continuous loop to the rotatable member whereby the continuous looped conductor is both rotatable about an axis lying in the plane of the loop and movable radially of the toroid along said axis.

References Cited in the file of this patent

UNITED STATES PATENTS

| | | |
|---|---|---|
| 440,640 | Lemp | Nov. 18, 1890 |
| 2,354,365 | Crossley | July 25, 1944 |
| 2,452,529 | Snoek | Oct. 26, 1948 |
| 2,762,020 | Gordon | Sept. 4, 1956 |

OTHER REFERENCES

"Ferromagnetic Spinels Using Lithium," by Weisz et al., "Ceramic Industry," vol. 58, #5, May 1952, pp. 76–78.